United States Patent
Dominique et al.

(10) Patent No.: US 7,885,238 B2
(45) Date of Patent: Feb. 8, 2011

(54) METHODS FOR DETECTING ACKNOWLEDGEMENT CHANNELS USING PROBABILITIES

(75) Inventors: Francis Dominique, Rockaway, NJ (US); Hongwei Kong, Denville, NJ (US); Ashok Armen Tikku, North Hills, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 798 days.

(21) Appl. No.: 11/882,680

(22) Filed: Aug. 3, 2007

(65) Prior Publication Data

US 2009/0034483 A1 Feb. 5, 2009

(51) Int. Cl.
*H04B 7/216* (2006.01)
(52) U.S. Cl. .................................... 370/335
(58) Field of Classification Search .......... 370/328–339
See application file for complete search history.

(56) References Cited

U.S. PATENT DOCUMENTS

| | | | |
|---|---|---|---|
| 6,839,336 B2 | 1/2005 | Tiedemann et al. | |
| 7,203,527 B2 | 4/2007 | Czaja et al. | |
| 7,372,831 B2* | 5/2008 | Kim et al. | 370/328 |
| 2003/0216123 A1 | 11/2003 | Wang et al. | |
| 2004/0252670 A1 | 12/2004 | Rong et al. | |
| 2005/0078640 A1 | 4/2005 | Kim et al. | |
| 2005/0169405 A1* | 8/2005 | Dominique et al. | 375/341 |

OTHER PUBLICATIONS

3rd Generation Partnership Project 2. "Physical Layer Standard for cdma2000 Spread Spectrum Systems", 3GPP2 C.S0002-C Version 1.0, May 28, 2002.

* cited by examiner

*Primary Examiner*—Frank Duong
(74) *Attorney, Agent, or Firm*—Harness, Dickey & Pierce

(57) ABSTRACT

A first transceiver determines whether a second transceiver has properly decoded at least one of a received data packet and control information associated with the corresponding data packet based on an estimated probability. The estimated probability is indicative of whether the second transceiver has properly decoded at least one of the data packet and associated control information.

20 Claims, 2 Drawing Sheets

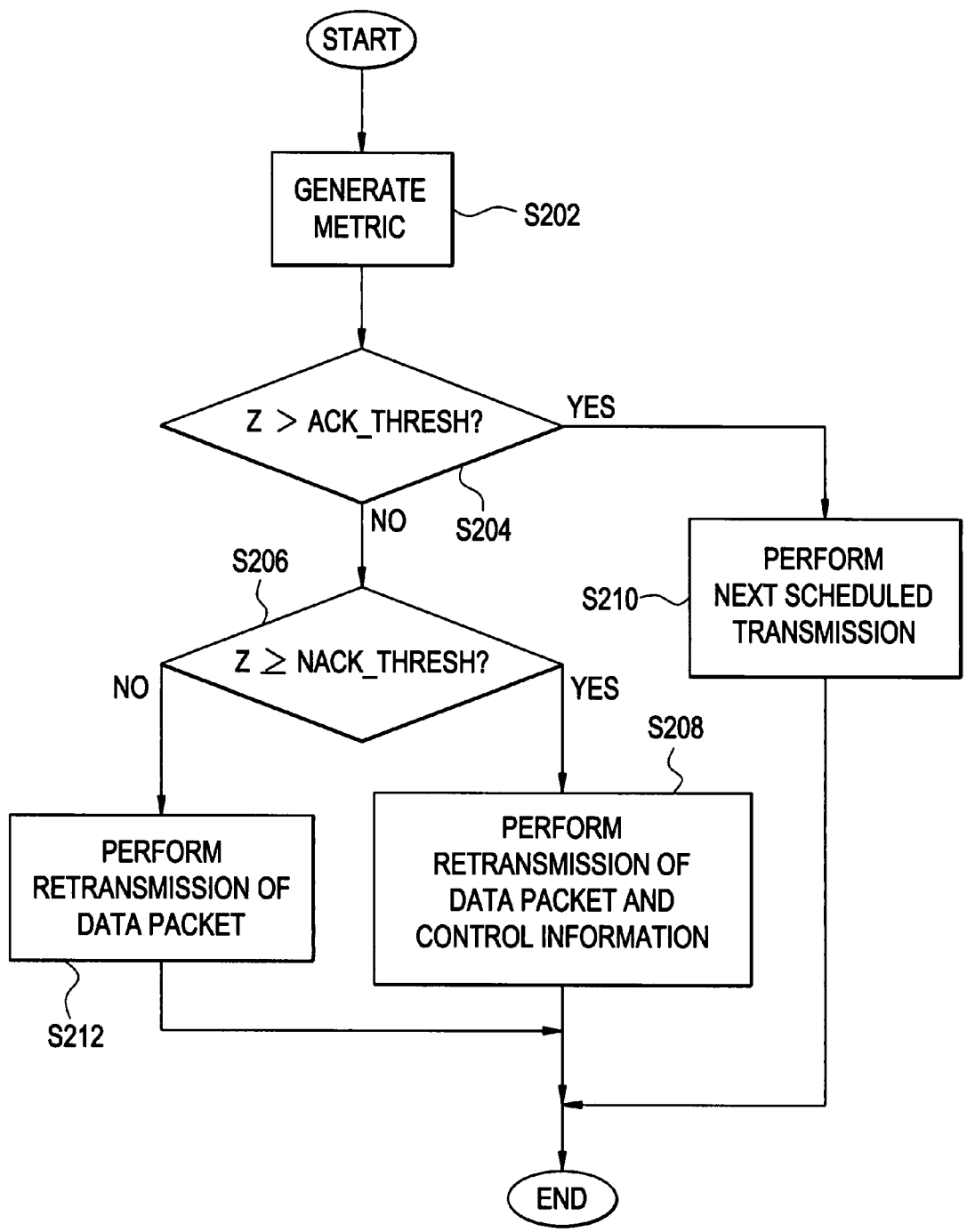

METHODS FOR DETECTING ACKNOWLEDGEMENT CHANNELS USING PROBABILITIES

BACKGROUND OF THE INVENTION

FIG. 1 illustrates a cell of a conventional wireless telecommunications system 100 operating in accordance with a code division multiple access protocol (e.g., cdma2000). As shown, the wireless telecommunications system 100 includes a radio network controller (RNC) 105 communicatively coupled to one or more base stations 110. For the sake of clarity, only a single base station 110 is shown. The RNC 105 may be communicatively coupled to the one or more base stations 110 by any of a variety of wired and/or wireless links. Signals passed between the RNC 105 and the one or more base stations 110 may pass through one or more other devices (not shown), such as, routers, switches, networks or the like.

Each base station 110 is associated with at least one cell 115. Each cell 115 corresponds to a geographic area having a given radius.

In operation, one or more mobile units 120-1-120-N establish concurrent wireless communication links with at least the base station 110 associated within the cell 115 in which the mobile units 120-1-120-N currently reside. Such a base station is referred to as a serving base station. As is also well-known, each of the mobile units 120-1-120-N may have one or more serving base stations at any given time.

Newer standards such as 1xEV-DV (also known as cdma2000, revision C) and Releases 5/6 of Universal mobile telecommunication system (UMTS) introduce a number of new features to the air interface architecture. For example, the 1xEV-DV standard defines a forward link data traffic channel called the packet data channel (PDCH). In UMTS, this forward link data channel is known as the High Speed Packet Data Channel (HS-PDSCH).

The PDCH provides both time-division and code-division multiplexed transmitted data. The PDCH is shared by packet data users.

Depending upon system loading as determined by wireless operators, the PDCH includes one to twenty-eight code-division multiplexed quadrature Walsh sub-channels, each spread by a 32-ary Walsh function. The PDCH may transmit packets in fixed sizes of 408, 792, 1560, 2328, 3096, and 3864 bits, and the system has variable packet durations of 1.25, 2.5, and 5.0 milliseconds (ms).

Transmitted in parallel with the PDCH is the packet data control channel (PDCCH). The PDCCH contains control information for the PDCH. According to cdma2000 Revision C, the PDCH and PDCCH are forward channels, and are sometimes referred to as the F-PDCH and F-PDCCH, respectively.

The F-PDCCH control information is necessary for the successful decoding of the F-PDCH. The F-PDCCH may include parameters such as a receiving mobile unit's medium access control identification (MAC ID), encoder packet size, number of slots per sub-packet, hybrid automatic repeat-request (H-ARQ) control information, and Walsh code index. The MAC ID is an eight-bit identifier matching transmissions to a particular mobile station during a voice and/or data call. This control information is carried in 37-bit packets, transmitted over the same packet duration as the corresponding PDCH packets.

A brief example regarding conventional transmission between base station 110 and mobile unit 120-1 in FIG. 1 will now be described.

Referring to FIG. 1, when the base station 110 sends a signal to the mobile unit 120-1, the base station 110 transmits on the F-PDCCH 24 and the F-PDCH 26 in parallel. On the receiving side, the mobile unit 120-1 demodulates and decodes the control signal on the F-PDCCH 24. The mobile unit 120-1 then determines if the transmission is intended for itself by checking whether the MAC ID carried on the F-PDCCH 24 matches its own MAC ID. If a match is found, the mobile unit 120-1 demodulates and decodes the data signal on the F-PDCH 26 based on the control information carried on the F-PDCCH 24. A successful signal transfer requires correct reception of signals on both the F-PDCCH 24 and F-PDCH 26 at the mobile unit 120-1.

When both the F-PDCCH 24 and F-PDCH 26 are received correctly, the mobile unit 120-1 transmits an acknowledgement message (ACK) to the base station 110 on the Reverse Acknowledgement Channel (R-ACKCH) 28. The ACK indicates a successful reception of the transmitted data packet at the mobile unit 120-1. If errors occur, the mobile unit 120-1 transmits a negative acknowledgement (NACK) or nothing (NULL) on the R-ACKCH 28 depending on which of the F-PDCCH 24 and the F-PDCH 26 is corrupted.

For example, if the F-PDCCH 24 is in error, the mobile unit 120-1 assumes that the corresponding F-PDCH 26 is directed to other mobile units, and transmits nothing (NULL) on the R-ACKCH 28.

If the F-PDCCH 24 is received correctly, but the F-PDCH 26 is received in error, the mobile unit 120-1 sends a NACK on the R-ACKCH 28 to indicate to the base station 110 that the data packet is in error (e.g., has not been received correctly).

Upon detecting a NACK or a NULL, within a prescribed time period after transmitting a data packet, the base station 110 may re-transmit the data packet to the mobile unit 120-1. The mobile unit 120-1 combines the re-transmission with the previous transmissions and decodes the data packet again. Collectively, the ACK, NACK or NULL message transmitted from the mobile unit 120-1 to the base station 110 may be referred to as a decoding indicator.

To detect whether an ACK, NACK or NULL has been transmitted by the mobile unit 120-1, the base station 110 decodes the R-ACKCH and typically compares the received transmission with a plurality of detection thresholds. Conventionally, the detection thresholds are chosen without regard to a priori probabilities of what has been transmitted by the mobile unit 120-1. That is, for example, conventionally, detection thresholds are chosen without regard to what should be expected to have been transmitted by the mobile unit 120-1. Such conventional detection schemes may result in a relatively large number of false detections (e.g., false positives or false negatives).

SUMMARY OF THE INVENTION

Example embodiments may reduce misclassification rates and/or improve system performance. For example, fewer false negatives may result in fewer unnecessary re-transmissions of packet data, which may result in greater data throughput.

Example embodiments take into account a priori probabilities, for example, the probability that a NULL is transmitted by the mobile unit in response to a transmitted data packet. Example embodiments may enable derivation of sharper thresholds allowing target bounds on false positives to be met while reducing the number of false negatives.

Example embodiments use a priori probabilities that the mobile transmits a NACK, NULL or ACK in detecting R-ACKCH transmissions. Example embodiments also provide methods for estimating these probabilities using a mobile unit's channel quality reports, the F-PDCH and F-PDCCH transmission power, the transmission format of the F-PDCH and information regarding the number of re-transmissions as well as the sub-packet identification of the re-transmissions. Using these a priori probabilities may improve detection error rates and/or system performance.

According to at least one example embodiment, a first transceiver may determine whether a second transceiver has properly decoded at least one of a received data packet and control information associated with the corresponding data packet based on an estimated probability. The estimated probability may be indicative of whether the second transceiver has properly decoded at least one of the data packet and associated control information.

According to at least one example embodiment, a first transceiver may determine whether a second transceiver has properly decoded at least one of a data channel and control channel associated with the data channel based on an estimated probability and a cost metric. The estimated probability may be indicative of whether the second transceiver has properly decoded at least one of the data channel and associated control channel, and the cost metric may be indicative of network cost associated with a lost or unnecessarily re-transmitted data packet.

According to at least one example embodiment, a first receiver may estimate a probability that an acknowledgment channel is carrying a first of a plurality of values based on channel quality metrics and transmission characteristics associated with a data channel and an associated control channel. The first of the plurality of values may be indicative of whether a second receiver has properly decoded at least one of the data channel and the associated control channel. Whether the second receiver has properly decoded at least one of the data channel and the associated control channel may be determined based on the estimated probability.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 2 illustrates a method for detecting an acknowledgement channel transmission according to an example embodiment.

DETAILED DESCRIPTION OF THE EMBODIMENTS

Figure 1:
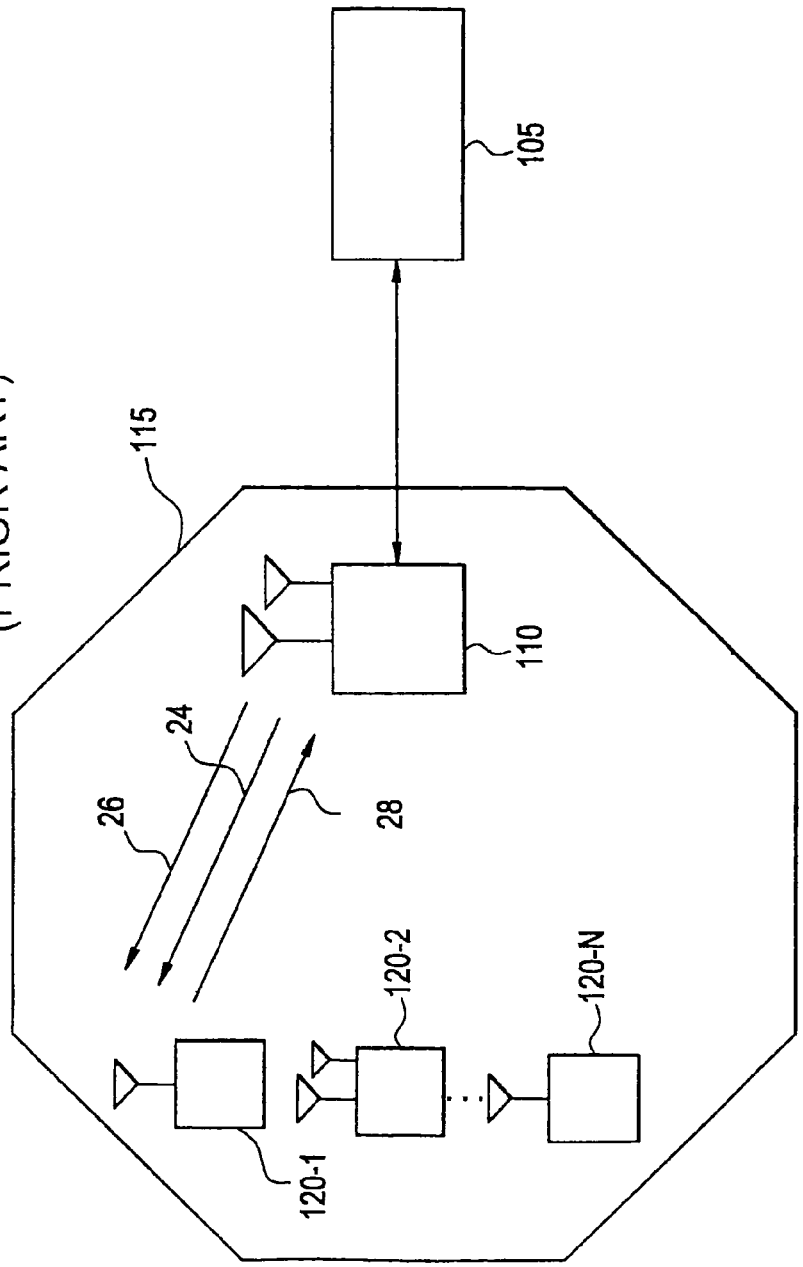
FIG. 1 illustrates a cell of a conventional wireless communications system.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments provide methods for detecting a transmission from a mobile unit using a priori probabilities. Example embodiments may be performed using existing well-known circuitry (e.g., a digital signal processor (DSP), application specific integrated circuit (ASIC), etc.) at a base station or a mobile unit. That is, for example, although example embodiments will be described with regard to the F-PDCH, F-PDCCH and the R-ACKCH, it will be understood that example embodiments may be equally applicable to a similar reverse-link data and control channel transmissions, and a forward-link acknowledgement transmission. Moreover, example embodiments will be described as being performed at the base station 110 shown in FIG. 1. However, similar operations may be performed at any or all mobile units 120-1-120-N.

As also discussed herein, s represents a transmitted ACK, NULL or NACK, wherein s∈[−1,0,1]. That is, for example, s=−1 represents a NACK, s=0 represents a NULL and s=1 represents an ACK.

Although example embodiments will be described with regard to the cell shown in FIG. 1 and in accordance with the cdma2000 protocol, example embodiments may be applicable to any wireless communications systems such as the above-mentioned UMTS High Speed Packet Data Channel (HS-PDSCH).

As used herein, the term "mobile unit" may be considered synonymous to, and may hereafter be occasionally referred to, as a mobile station, mobile, mobile user, user equipment (UE), subscriber, user, remote station, access terminal, receiver, etc., and may describe a remote user of wireless resources in a wireless communication network. The term "base station" may be considered synonymous to and/or referred to as a base transceiver station (BTS); base station, NodeB, etc. and may describe equipment that provides data and/or voice connectivity between a network and one or more users.

As is well-known in the art, each of a mobile unit and a base station may have transmission and reception capabilities. Therefore, in some cases, the mobile unit and/or base station may be referred to as a transceiver.

FIG. 2 illustrates a method for determining whether a transmitted data channel and/or control channel has been received and/or properly decoded at a mobile unit according to an example embodiment. In other words, the example embodiment shown in FIG. 2 illustrates a method for determining whether a data packet transmitted on the F-PDCH and/or control information transmitted on the F-PDCCH has been received and/or properly decoded at a mobile unit. The method shown in FIG. 2 will be discussed with regard to the portion of the wireless communications system shown in FIG. 1 for the sake of clarity.

Although FIG. 2 illustrates one example embodiment, in another example embodiment, the steps S206 and S212 may be omitted, and the method may be performed based on a single threshold and including steps S202, S204, S208 and S210.

Referring to FIGS. 1 and 2, upon receiving a transmission on the reverse acknowledgement channel (R-ACKCH), the base station 110 may generate an acknowledgement detection metric z associated with the received acknowledgement signal at step S202. For the sake of clarity, a transmission received on the R-ACKCH will be referred herein as an "acknowledgement signal," or "acknowledgement transmission." Methods for generating the acknowledgement detection metric z will be discussed in more detail below.

Acknowledgement signals $r_i^j$ received at the base station 110 may be given by Equation (1) shown below.

$$r_i^j = \alpha h_i^j s + n_i^j \qquad (1)$$

In Equation (1), index i refers to Walsh symbols and j refers to RAKE fingers of a receiving antenna at the base station 110. Moreover, $n_i^j$ represents white Gaussian noise in the received acknowledgement signal and $h_i^j$ represents the propagation channel. As discussed above, s∈[−1,0,1] the ACK, NACK or NULL transmitted by the mobile unit 120-1. That is, for example, s=−1 when the mobile unit 120-1 transmits a NACK, s=1 when the mobile unit 120-1 transmits an ACK, and s=0 when nothing is transmitted by the mobile unit 120-1 during a time period after transmission of a data packet on the F-PDCH. Still referring to Equation (1), $\alpha=10^{TP/20}$, where TP is the traffic to pilot ratio of the R-ACKCH in decibels.

Given Equation (1), the acknowledgement detection metric z at the base station 110 is given by Equation (2) shown below.

$$z = Re\left(\frac{\sum_{i,j} \hat{h}_i^j * r_i^j}{\alpha \sum_{i,j} |\hat{h}_i^j|^2}\right) \qquad (2)$$

In Equation (2), $\hat{h}_i^j$ is the channel estimate of the propagation channel $h_i^j$. For the purposes of this explanation and clarity, channel estimation errors are assumed negligible, and thus, $$h_i^j = \hat{h}_i^j.$$

Given this assumption, Equation (2) may be simplified to Equation (3) shown below.

$$z = s + Re\left(\frac{\sum_{i,j} h_i^j * n_i^j}{\alpha \sum_{i,j} |h_i^j|^2}\right) \qquad (3)$$

As discussed above, $n_i^j$ represents white Gaussian noise in the received acknowledgement signal. Because $h_i^j$ is assumed to be known at the base station 110, courtesy of any well-known channel estimation technique, the acknowledgement detection metric z may be modeled as a Gaussian random variable with mean E(z)=s and variance var(z) given by Equation (4) shown below.

$$var(z) = \frac{\sigma^2}{2\alpha^2 \sum_{i,j} |h_i^j|^2} \qquad (4)$$

$$\sigma^2 = E|n_i^j|^2$$

In Equation (4), is assumed to be known and essentially constant as a result of Automatic Gain Control (AGC) at the base station 110, which is well-known in the art.

As shown from the above Equations (1)-(4), the base station 110 may determine the acknowledgement detection metric z based on characteristics of the received acknowledgement signal (e.g., traffic to pilot ratio of the R-ACKCH and white Gaussian noise in the received acknowledgement signal), and knowledge of the propagation channel $h_i^j$ obtained, for example, from channel estimates as is well-known in the art.

Referring back to FIG. 2, at step S204, the base station 110 may compare the acknowledgement detection metric z with a first threshold ACK_THRESH. The first threshold ACK_THRESH may also be referred to as an acknowledgement threshold. If the acknowledgement detection metric z is greater than the threshold ACK_THRESH (z>ACK_THRESH), the base station 110 determines the mobile unit 120-1 has transmitted an ACK (s=1). As discussed above, an ACK indicates that the mobile unit 120-1 has properly received and decoded the transmitted data packet (e.g., properly received and decoded the transmitted F-PDCCH and F-PDCH). In response to receiving an ACK from the mobile unit 120-1, the base station 110 may transmit the next scheduled data packet and associated control information at step S210.

Returning to step S204 of FIG. 2, if the acknowledgment detection metric z is less than or equal to threshold ACK_THRESH (z≦ACK_THRESH), the base station 110 may compare the acknowledgement detection metric z with a second threshold NACK_THRESH at step S206. The second threshold NACK_THRESH may also be referred to as a negative acknowledgement threshold. If the base station 110 determines the acknowledgement detection metric z is greater than or equal to the threshold NACK_THRESH (z≧NACK_THRESH), the base station 110 determines the mobile unit 120 has not transmitted either an ACK or a NACK. That is, for example, a NULL (s=0) has been received from the mobile unit 120-1. As discussed above, a NULL indicates that the mobile unit 120-1 has not correctly received or properly decoded the F-PDCCH corresponding to the transmitted F-PDCH.

In response to detecting a NULL (s=0) at step S206, the base station 110 may perform a re-transmission at step S208. In at least one example embodiment, upon detecting a NULL, the base station 110 may re-transmit the previous data packet and associated control information. The re-transmission may be performed at a higher power than the previous transmission.

Returning to step S206, if the base station 110 determines that the acknowledgement detection metric z is less than the threshold NACK_THRESH (z<NACK_THRESH), the base station 110 determines a NACK (s=−1) has been received from the mobile unit 120-1. As discussed above, a NACK indicates that the mobile unit 120-1 has not correctly or properly decoded the F-PDCH. In response to detecting a NACK (s=−1), the base station 110 may perform a re-transmission at step S212. In at least one example embodiment, upon detecting a NACK, the base station 110 may re-transmit the previous data packet. The re-transmission may be performed at a higher power than the previous transmission.

According to example embodiments, the thresholds ACK_THRESH and/or NACK_THRESH may be determined based on a prion probabilities of whether the mobile unit 120-1 has transmitted an ACK, NACK or NULL. Accordingly, the base station 110 may determine whether the mobile unit 120 has properly received and decoded a transmitted data packet based on these a priori probabilities. In other words, for example, the base station 110 may detect a transmission on the R-ACKCH based on one or more a priori probabilities.

A more detailed example of methods for determining thresholds ACK_THRESH and NACK_THRESH and the a priori probabilities will be discussed in more detail below.

In a first example, for the sake of clarity, s=0 and s=1 are assumed to be the only possible outcomes for s. In this case, ACK_THRESH may be chosen (e.g., from a look-up table) such that the probability Prob(s=1|s=0) is represented by Equation (5) shown below. The probability Prob (s=1|s=0) represents the probability that the base station 110 detects an ACK (e.g., s=1 or z>ACK_THRESH), when the mobile unit 120-1 actually transmits a NULL (s=0).

$$\mathrm{Prob}(s=1|s=0)=p\_\mathrm{thresh}/\mathrm{Prob}(s=0) \quad (5)$$

In Equation (5), p_thresh is a target bound determined based on overall system performance. The target bound p_thresh may be determined by system engineers when engineering the system to meet certain overall performance requirements. These performance requirements may also be specified by various standards organizations as well as customer requirements. An example value for the probability Prob(s=1|s=0) for typical wireless applications is about $10^{-2}$. The probability Prob(s=0) is the probability that the mobile unit 120-1 has transmitted a NULL to the base station 110 in response to the transmitted F-PDCH. In other words, probability Prob(s=0) represents the probability that the mobile unit 120-1 was incapable of decoding (e.g., did not properly decode) the transmitted F-PDCCH.

As is well-known in the art, because the base station 110 transmits the F-PDCCH, the base station 110 has knowledge of the F-PDCCH transmit power and the type of coding employed to transmit the F-PDCCH. The base station 110 may also determine the transmission power at which the mobile unit 120-1 received the F-PDCCH based on channel quality metrics such as channel quality reports (e.g., the channel quality indicator (CQI)) received on the well-known reverse-link channel quality indicator channel (R-CQICH). Methods for doing so are well-known in the art, and therefore, a detailed discussion will be omitted for the sake of brevity.

Using the above-described control channel characteristics and metrics, the base station 110 may estimate the probability Prob(s−0) using the well-known SIR based virtual decoder. Because SIR based virtual decoders are well known in the art, only the following brief discussion will be provided for the sake of brevity.

In relatively simple terms, an SIR based virtual decoder utilizes a lookup table to calculate an error rate based on knowledge of the signal to interference ratio (SIR) and the propagation channel. The relationship between the SIR, propagation channel and error rate may be determined a priori via exhaustive simulations and/or lab measurements for a variety of SIRs and propagation channels. The SIR for a particular mobile unit may be determined from the Channel Quality Indicator (CQI) values transmitted on the CQI channel (CQICH) by the mobile unit to the base station. These CQI values represent the SIR of the downlink common pilot channel seen by the mobile unit. Knowledge of the propagation channel may be inferred from the Doppler measurements made at the base station for that particular mobile unit as well as the number of RAKE fingers at the base station. Once these values are determined at the base station, the probability Prob(s=0) may be determined by looking up this table. Example values for the probability Prob(s=0) may be on the order of $10^{-1}$, $10^{-2}$ or $10^{-3}$, depending upon the application and network performance.

Still referring to Equation (5), if probability Prob(s=0) is unknown, then ACK_THRESH may be selected based on a worst case assumption, for example, Prob(s=0)=1. In this example, Prob (s=1|s=0)=p_thresh. Using thresholds based on the worst case assumption may degrade performance because these worst case scenarios may occur for a relatively small fraction of the time, and thus, general system performance may be unnecessarily penalized.

As evident from Equation (5), a sharper threshold may be chosen if Prob[s=0] is known. According to example embodiments, a sharper threshold ACK_THRESH may be chosen to reduce misclassification rates. A misclassification rate is the probability that the base station 110 detects a NULL, when the mobile unit 120-1 has actually transmitted an ACK (e.g., Prob(s=0|s=1)). In addition, estimating and using knowledge of Prob(s=0) in detecting transmissions on the R-ACKCH may enable the optimal ACK_THRESH to vary with time, thereby tracking the variation in_ Prob(s=0), which may also vary with time.

A more detailed, second example for determining threshold ACK_THRESH will now be described. In this example, s=0 and s=1 are again assumed to be the only possible outcomes for the sake of clarity. In addition, for the purposes of this explanation, an ACK (s=1) is assumed detected by the base station 110 when z>ACK_THRESH, wherein ACK_THRESH∈[0,1], and a NULL (s=0) is assumed detected by the base station 110 when z≦ACK_THRESH.

Given the above assumptions, satisfying the constraints given by Equations (6) and (7) may limit the number of false positives. In Equations (6) and (7), Prob(s=1|s=0) is referred to as the false alarm probability and the probability Prob(s≠1|s=1) is referred to as the misclassification probability.

$$\text{Prob}(s=1|s=0) \leq 10^{-3} \quad (6)$$

$$\text{Prob}(s \neq 1|s=1) \leq 10^{-1} \quad (7)$$

The constraints given by Equation (6) and (7) may be determined based on a desired quality of service (QoS) (or QoS metric) for a particular application. As is well-known in the art, QoS determinations may be made by system engineers engineering a network for a given set of applications.

Equation (6) constrains the probability of detecting an ACK when a NULL is actually transmitted by the mobile unit 120-1 to less than or equal to $10^{-3}$. Equation (7) constrains the probability of detecting a NULL when an ACK has actually been transmitted by the mobile unit 120-1 to less than or equal to $10^{-1}$. To ensure constraints given by Equations (6) and (7) are met, threshold ACK_THRESH may be chosen (e.g., from a look-up table) to satisfy both Equations (8) and (9) shown below.

$$\text{ACK\_THRESH} \leq 1 - \frac{1.28}{\sqrt{\sum_{i,j} |h_i^j|^2 / \sigma^2}} \quad (8)$$

$$\text{ACK\_THRESH} \geq \frac{3.10}{\sqrt{\sum_{i,j} |h_i^j|^2 / \sigma^2}} \quad (9)$$

In this example, if $$\sum_{i,j} |h_i^j|^2 / \sigma^2 \geq 19.2,$$

then threshold ACK_THRESH satisfying the constraints given by Equations (8) and (9) exists, and ACK_THRESH=0.708 is feasible.

According to example embodiments, a decision may be made reliably when $$\sum_{i,j} |h_i^j|^2 / \sigma^2 \geq 19.2.$$

If the wireless communications system has two branch diversity with an $E_c/N_0$=−19 dB per branch, for an AWGN channel, $$\sum_{i,j} |h_i^j|^2 / \sigma^2 \geq 19.2.$$

For Rayleigh fading channels, effects of power control on the probability of reaching decisions more reliably may be considered. This may be done analytically by running simulations as is well-known in the art. A case in which no power control is considered may be more easily analyzed as is also well-known in the art.

In another example, to ensure the probability of a false acknowledgement (e.g., detecting an ACK, when a NULL or NACK is actually transmitted) is relatively low, the constraint given by Equation (10) may be used.

$$\text{Prob}(s=1|s\neq1)=\text{Prob}(s=1|s=0)\times\text{Prob}(s=0|s\neq1)+\text{Prob}(s=1|s=-1)\times\text{Prob}(s=-1|s\neq1)<10^{-3} \quad (10)$$

As shown in Equation (10), the probability of reaching decisions reliably may depend on the probability of detecting a NULL (s=0), when either a NULL or a NACK is transmitted (e.g., Prob(s=0|s≠1)) and the probability of detecting a NACK (s=−1), when either a NULL or a NACK is transmitted (e.g., Prob(s=−1|s≠1)). If the probability Prob(s=0)=0, the probability of making more reliable decisions may improve.

With respect to Equation (10), for a Rayleigh fading channel with a Doppler of 30 kph, and no power control, a decision may be reached reliably approximately 98% of the time.

Although a detailed discussion is omitted for the sake of brevity, the threshold NACK_THRESH may be chosen in the same or substantially the same manner as discussed above with regard to the threshold ACK_THRESH.

In yet another one example embodiment, thresholds ACK_THRESH and/or NACK_THRESH may be determined based on Bayes criterion. The a priori probabilities may be obtained using reverse link reports, measurements and/or forward link power settings. In this example, a risk R to be minimized may be identified and a priori probabilities and cross-factors may be determined based on the identified risk R.

One example of risk R may be given by Equation (11) as shown below.

$$R = \sum_{i=0}^{2} \sum_{j=0}^{2} P_j C_{ij} \int_{Z_i} p(H_i | H_j) dr \quad (11)$$

In Equation (11), $H_0$, $H_1$ and $H_2$ denote the NULL, NACK and ACK transmissions, respectively, received by the base station 110. The probabilities $P_0$, $P_1$ and $P_2$ denote a priori probabilities that each of the $H_0$, $H_1$ and $H_2$, respectively, are received at the base station 110 at any given time. The variable $C_{ij}$ represents the cost for a false positive, wherein $C_{ij}$ is an element of [0,1]. That is, for example, $C_{ij}$ represents the cost for determining the mobile unit 110 has transmitted $H_i$, when the mobile unit 10 actually transmitted $H_j$, where i,j=0, 1, 2 and $H_i$ is different from $H_j$. According to example embodiments, the cost $C_{ij}$ may be indicative of the cost of a lost packet on the network. Alternatively, the cost $C_{ij}$ may refer to the cost of unnecessary retransmission of a packet on the network.

Probability $\text{Pr}_{ij}$ denotes the probability of choosing $H_i$ when the mobile unit 120-1 actually transmits $H_j$. Probability $p(H_i|H_j)$ is a conditional probability of detecting $H_i$ when the mobile unit 120-1 transmits $H_j$. More particularly, $p(H_i|H_j)$ represents the probability density of the risk R if the mobile unit 120-1 transmits $H_j$, where j=0, 1, 2. Variable $Z_i$ is the region of observation space in which $H_j$ is chosen. The probabilities $p(H_i|H_j)$ are the same as the false alarm probability (e.g., Prob(s=1|s=0)) and miss-classification probability (e.g., Prob(s≠1|s=1)) as described above, depending upon the values of i and j at any given time. For example, $p(H_2|H_0)$ is the false alarm probability using the above-described notations.

Decision rules for minimizing the risk R are given by Equations (12)-(16) shown below.

$$P_1(C_{01} - C_{11})\Lambda_1(r) \underset{H_0 \text{ or } H_2}{\overset{H_1 \text{ or } H_2}{\gtreqless}} P_0(C_{10} - C_{00}) + P_2(C_{12} - C_{02})\Lambda_2(r) \quad (12)$$

$$P_2(C_{02} - C_{22})\Lambda_2(r) \underset{H_0 \text{ or } H_1}{\overset{H_2 \text{ or } H_1}{\gtreqless}} P_0(C_{20} - C_{00}) + P_1(C_{21} - C_{01})\Lambda_1(r) \quad (13)$$

$$P_2(C_{12} - C_{22})\Lambda_2(r) \underset{H_1 \text{ or } H_0}{\overset{H_2 \text{ or } H_0}{\gtreqless}} P_0(C_{20} - C_{10}) + P_1(C_{21} - C_{11})\Lambda_1(r) \quad (14)$$

In Equations (13) and (14), $\Lambda_1(r)$ and $\Lambda_2(r)$ are likelihood ratios. The likelihood ratios $\Lambda_1(r)$ and $\Lambda_2(r)$ may be given by Equations (15) and (16) shown below.

$$\Lambda_1(r) \equiv \frac{p(H_i|H_1)}{p(H_i|H_0)} \quad (15)$$

$$\Lambda_2(r) \equiv \frac{p(H_i|H_2)}{p(H_i|H_0)} \quad (16)$$

As evidenced by Equation (15), for example, the likelihood ratio $\Lambda_1(r)$ represent the ratio of the probability of detecting $H_i$ given that $H_1$ has been transmitted (e.g., given j=1) relative to the probability of detecting $H_i$ given that $H_0$ has been transmitted (e.g., given j=0). Equation (16) may be read similarly.

The base station 110 may determine a priori probabilities (e.g., $P_0$, $P_1$ and $P_2$) of a transmitted symbol on the R-ACKCH based on information reported and/or measured in the forward link. For example, such information may include:

(1) Reverse acknowledgement channel timing, that is for example, whether the uplink receiver is expecting an acknowledgement message in the power control group (PCG);
(2) Reporting of the downlink common pilot signal strength in the CQI channel;
(3) Relative power level of the packet data channel F-PDCCH to the downlink common pilot channel;
(4) Relative power level of the F-PDCH to the downlink common pilot channel;
(5) Doppler spread frequency offset measurement in the reverse link; and/or
(6) Number of active fingers and relative finger strength reported from a reverse link finger management block as is well-known in the art.

According to at least this example embodiment, probability $P_0$ may be determined based on items (1)-(3) and (5)-(6), whereas probabilities $P_1$ and $P_2$ may be determined based on (1)-(2) and (4)-(6). According to example embodiments, these probabilities $P_0$, $P_1$ and $P_2$ may be determined using a lookup table based on the above described criteria as is well-known in the art.

The cost $C_{ij}$ of making an erroneous decision may be determined based on performance requirements set by, for example, standards organizations or by customer requirements such as degradation of data throughput at a higher layer. To normalize costs, it is assumed that no cost exists for making a correct decision, thereby giving Equation (17).

$$C_{00} = C_{11} = C_{22} = 0 \quad (17)$$

According to example embodiments, a value of 0 for the cost $C_{ij}$ indicates there is no penalty, whereas a value of 1 corresponds to a maximum penalty. Given Equation (17), an erroneous decision by declaring a NULL or NACK to be an ACK may result in packet loss. Thus, giving Equation (18).

$$C_{20} = C_{21} = 1 \quad (18)$$

Given Equations (17) and (18), Equations (12)-(14), may be simplified to Equations (19)-(21) respectively.

$$P_1 C_{01} \Lambda_1(r) \underset{H_0 \text{ or } H_2}{\overset{H_1 \text{ or } H_2}{\gtreqless}} P_0 C_{10} + P_2(C_{12} - C_{02})\Lambda_2(r) \quad (19)$$

$$P_2 C_{02} \Lambda_2(r) \underset{H_0 \text{ or } H_1}{\overset{H_2 \text{ or } H_1}{\gtreqless}} P_0 + P_1(1 - C_{01})\Lambda_1(r) \quad (20)$$

$$P_2 C_{12} \Lambda_2(r) \underset{H_1 \text{ or } H_0}{\overset{H_2 \text{ or } H_0}{\gtreqless}} P_0(1 - C_{10}) + P_1 \Lambda_1(r) \quad (21)$$

The cost $C_{10}$, $C_{12}$, $C_{01}$ and $C_{02}$ may be values between 0 and 1, and may be defined by system level simulations or by overall performance requirements set by system engineers when engineering the network for specific target performance based on applications to be run over the network. In another example, $C_{20}$ and $C_{21}$ may be unequal, but one of $C_{20}$ and $C_{21}$ may cause worse data throughput degradation and may be assigned a cost of 1.

Equations (19)-(21) represent equations that may be implemented by a detector at base station 110 to determine whether an ACK, NACK or NULL has been transmitted by the mobile unit 120.

The invention being thus described, it will be obvious that the same may be varied in many ways. Such variations are not to be regarded as a departure from the invention, and all such modifications are intended to be included within the scope of the invention.

We claim:

1. A method comprising:
   estimating, at a first transceiver, a probability of whether a second transceiver has properly decoded at least one of a data packet and associated control information probability based on channel characteristics and channel metrics associated with at least one of a data channel on which the data packet is received and an associated control channel on which the control information is received;
   determining, at the first transceiver, whether the second transceiver has properly decoded at least one of the received data packet and control information based on the estimated probability.

2. The method of claim 1, further comprising:
   receiving an acknowledgement channel transmission indicating whether the second transceiver has properly decoded at least one of the data packet and associated control information;
   generating a detection metric associated with the received acknowledgement channel transmission based on acknowledgement channel characteristics; and wherein
   the determining step determines whether the second transceiver has properly decoded at least one of the data packet and associated control information based on the detection metric and the estimated probability.

3. The method of claim 2, wherein the determining step further comprises:
   comparing the detection metric with a first threshold value, the first threshold value being generated based on the estimated probability; and determining whether the second transceiver has properly decoded the data packet based on the comparing step.

4. The method of claim 3, wherein the determining step determines the second transceiver has properly decoded the data packet and associated control information if the detection metric is greater than the first threshold value.

5. The method of claim 3, wherein the determining step determines the second transceiver has not properly decoded the data packet if the detection metric is less than or equal to the first threshold value.

6. The method of claim 5, further comprising:
comparing the detection metric with a second threshold value, the second threshold value being generated based on the estimated probability, and being less than the first threshold value;
determining whether the second transceiver has properly decoded the control information based on the comparing step.

7. The method of claim 6, wherein the determining step determines the second transceiver has not properly decoded the control information if the detection metric is greater than the second threshold value but less than or equal to the first threshold value.

8. The method of claim 6, wherein the determining step determines the second transceiver has properly decoded the control information, but not properly decoded the data packet if the detection metric is less than or equal to the second threshold value.

9. The method of claim 1, wherein the estimated probabilities are conditional probabilities.

10. The method of claim 1, further comprising:
receiving an acknowledgement channel transmission indicating whether the second transceiver has properly decoded at least one of the data packet and associated control information;
generating a detection metric associated with the received acknowledgement channel transmission based on acknowledgement channel characteristics;
selecting a first threshold value based on the estimated probability;
comparing the detection metric with the first threshold value; and wherein
the determining step determines whether the second transceiver has properly decoded the data packet and the associated control information based on the comparing step.

11. The method of claim 10, wherein the selecting step selects the first threshold value based on probability constraints, the probability constraints limiting the probability of an occurrence of false positive detections at the first transceiver.

12. The method of claim 1, further comprising:
receiving an acknowledgement channel transmission indicating whether the second transceiver has properly decoded at least one of the data packet and associated control information.

13. The method of claim 1, wherein the channel characteristics include at least one of transmit power, coding, and receiving power associated with at least one of the data channel and associated control channel at the second transceiver.

14. The method of claim 1, wherein the channel metrics include channel quality metrics associated with at least one of the data channel and associated control channel.

15. The method of claim 1, further comprising:
re-transmitting the data packet if the determining step determines that the second receiver has not properly decoded the data packet.

16. A method comprising:
estimating, at a first transceiver, a probability of whether a second transceiver has properly decoded at least one of a data channel and an associated control channel based on channel characteristics and channel metrics associated with at least one of the data channel and associated control channel;
determining, at the first transceiver, whether the second transceiver has properly decoded at least one of the data channel and associated control channel based on the estimated probability and a cost metric, the cost metric being indicative of network cost associated with a lost or unnecessarily re-transmitted data packet.

17. The method of claim 16, further comprising:
receiving an acknowledgement channel transmission indicating whether the second transceiver has properly decoded at least one of the data channel and the associated control channel.

18. The method of claim 16, wherein the estimated probabilities are conditional probabilities.

19. A method comprising:
estimating, at a first receiver, a probability that an acknowledgment channel is carrying a first of a plurality of values based on channel quality metrics and transmission characteristics associated with a data channel and an associated control channel, the first of the plurality of values being indicative of whether a second receiver has properly decoded at least one of the data channel and the associated control channel; and
determining whether the second receiver has properly decoded at least one of the data channel and the associated control channel based on the estimated probability.

20. The method of claim 19, further comprising:
generating a detection metric associated with the received acknowledgement channel based on acknowledgement channel characteristics;
generating a first threshold value and a second threshold value based on the estimated probabilities, the first threshold value being greater than the second threshold value; and wherein
the determining step determines whether the second transceiver has properly decoded at least one of the data channel and associated control channel based on the detection metric, the first threshold value and the second threshold value.

* * * * *